United States Patent
Chang et al.

(10) Patent No.: US 8,789,071 B2
(45) Date of Patent: Jul. 22, 2014

(54) INTEGRATED EXTENSION FRAMEWORK

(75) Inventors: David W. Chang, San Jose, CA (US); Anshul Dawra, San Jose, CA (US); Holger Karn, Aidlingen (DE); Bilung Lee, San Jose, CA (US); Paul A. Ostler, Yakima, WA (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/250,387

(22) Filed: Sep. 30, 2011

(65) Prior Publication Data
US 2012/0036516 A1    Feb. 9, 2012

Related U.S. Application Data

(63) Continuation-in-part of application No. 12/248,753, filed on Oct. 9, 2008, now abandoned.

(51) Int. Cl.
*G06F 13/00* (2006.01)

(52) U.S. Cl.
USPC ......................................... 719/328

(58) Field of Classification Search
None
See application file for complete search history.

(56) References Cited

U.S. PATENT DOCUMENTS

| | | | |
|---|---|---|---|
| 6,405,215 B1 | 6/2002 | Yaung | |
| 6,708,189 B1 * | 3/2004 | Fitzsimons et al. | 1/1 |
| 6,714,976 B1 | 3/2004 | Wilson et al. | |
| 6,742,181 B1 | 5/2004 | Koike et al. | |
| 6,792,460 B2 | 9/2004 | Oulu et al. | |
| 6,795,403 B1 | 9/2004 | Gundavelli | |
| 7,062,540 B2 | 6/2006 | Reddy et al. | |
| 7,079,010 B2 | 7/2006 | Champlin | |
| 7,401,143 B2 | 7/2008 | Oulu et al. | |
| 7,406,695 B2 * | 7/2008 | Dattke et al. | 719/315 |
| 7,426,512 B1 | 9/2008 | Ben-Natan | |
| 8,046,403 B2 * | 10/2011 | Mazzaferri | 709/202 |
| 2001/0003824 A1 * | 6/2001 | Schnier | 709/203 |
| 2002/0059399 A1 | 5/2002 | Learmonth | |
| 2002/0099814 A1 | 7/2002 | Mastrianni | |
| 2002/0112040 A1 | 8/2002 | Chang et al. | |
| 2003/0041167 A1 | 2/2003 | French et al. | |
| 2003/0110252 A1 | 6/2003 | Yang-Huffman | |
| 2003/0110253 A1 | 6/2003 | Anuszczyk et al. | |
| 2003/0158839 A1 | 8/2003 | Faybishenko et al. | |

(Continued)

FOREIGN PATENT DOCUMENTS

| | | |
|---|---|---|
| EP | 0918412 A2 | 5/1999 |
| JP | 10083322 A | 3/1998 |

OTHER PUBLICATIONS

English Abstract and Machine Translation for JP10083322A, published Mar. 31, 1998, Total 9 pp.

(Continued)

*Primary Examiner* — H S Sough
*Assistant Examiner* — Phuong Hoang
(74) *Attorney, Agent, or Firm* — Janaki K. Davda; Konrad, Raynes, Davda & Victor LLP (57) ABSTRACT

Provided are techniques for extending functionality of an application. A request to create an application object is received. In response to receiving the request, the application object is created, and an extension proxy object is created. The extension proxy object is wrapped around the application object. An invocation of a function of the extension proxy object is received from the application object.

18 Claims, 10 Drawing Sheets

(56) References Cited

U.S. PATENT DOCUMENTS

| | | |
|---|---|---|
| 2003/0217068 A1 | 11/2003 | Fruchtman et al. |
| 2004/0030768 A1 | 2/2004 | Krishnamoorthy et al. |
| 2004/0054770 A1 | 3/2004 | Touboul |
| 2004/0088403 A1 | 5/2004 | Aggarwal |
| 2004/0255302 A1 | 12/2004 | Trossen |
| 2005/0047350 A1 | 3/2005 | Kantor et al. |
| 2005/0198275 A1 | 9/2005 | D'Alo et al. |
| 2005/0228880 A1 | 10/2005 | Champlin |
| 2005/0251809 A1* | 11/2005 | Gunduc et al. ............... 719/310 |
| 2006/0010078 A1 | 1/2006 | Rezvani et al. |
| 2006/0200450 A1 | 9/2006 | Keane et al. |
| 2006/0218640 A1 | 9/2006 | Lotem et al. |
| 2006/0235742 A1 | 10/2006 | Castellanos et al. |
| 2006/0271656 A1 | 11/2006 | Yagawa |
| 2006/0277295 A1 | 12/2006 | Masuda et al. |
| 2007/0033279 A1 | 2/2007 | Battat et al. |
| 2007/0067663 A1 | 3/2007 | Surasinghe |
| 2007/0073878 A1* | 3/2007 | Issa ............................. 709/225 |
| 2007/0168509 A1* | 7/2007 | Droshev et al. .............. 709/225 |
| 2007/0198524 A1 | 8/2007 | Branda et al. |
| 2008/0030363 A1 | 2/2008 | Rezvani et al. |
| 2008/0082588 A1 | 4/2008 | Ousterhout et al. |
| 2008/0113652 A1 | 5/2008 | Liu |
| 2008/0235710 A1* | 9/2008 | Challenger et al. ........... 719/316 |
| 2009/0007139 A1* | 1/2009 | Jacobson et al. .............. 719/313 |
| 2009/0013064 A1 | 1/2009 | Taylor et al. |
| 2009/0031174 A1 | 1/2009 | Moon |
| 2009/0157800 A1* | 6/2009 | Cheng et al. .................. 709/203 |
| 2009/0165132 A1 | 6/2009 | Jain et al. |
| 2009/0204702 A1 | 8/2009 | Jensen et al. |
| 2009/0228519 A1 | 9/2009 | Purcell et al. |
| 2009/0271511 A1 | 10/2009 | Peracha |
| 2009/0288098 A1* | 11/2009 | Abd-El-Malek et al. ..... 719/312 |
| 2010/0094988 A1 | 4/2010 | Chang et al. |
| 2010/0265846 A1 | 10/2010 | Weniger |
| 2010/0281456 A1 | 11/2010 | Eizenman et al. |

OTHER PUBLICATIONS

Amendment 1, Jan. 14, 2011, for U.S. Appl. No. 12/248,753, Total 11 pp.

Final Office Action 1, Apr. 1, 2011, for U.S. Appl. No. 12/248,753, Total 17 pp.

Office Action 1, Sep. 14, 2010, for U.S. Appl. No. 12/248,753, Total 17 pp.

* cited by examiner

INTEGRATED EXTENSION FRAMEWORK

CROSS-REFERENCE TO RELATED APPLICATIONS

This application is a continuation-in-part application and claims the benefit of abandoned U.S. application Ser. No. 12/248,753, filed Oct. 9, 2008, the entire contents of which is incorporated herein by reference.

BACKGROUND

1. Field

Embodiments of the invention relate to an automatic discovery framework for integrated monitoring of database performance.

2. Description of the Related Art

Database monitoring is often required for performance analysis and problem determination in a modern complex database environment. One existing approach today is to provide an interface wrapper around client applications to gather statistics for monitoring. The interface wrapper intercepts the database access via client interfaces. Thus, the information is limited to the client side only and is unable to provide detailed statistics.

Another existing approach is to have a network listener to intercept the database access to collect monitoring data. The network listener gathers information only from network traffic and cannot provide details on either the server or the client statistics. As a result, this approach does not provide complete end-to-end monitoring and will not work if the network flow is encrypted.

Moreover, typical monitoring solutions existing today are not well-suited for deployment in a distributed enterprise environment because they often require separate installation (on the clients and servers) and manual configuration (on the clients and servers).

Also, it can be difficult to add enhancements to existing applications for which the applications were not designed.

SUMMARY

Provided are a method, computer program product, and computer system for extending functionality of an application. A request to create an application object is received. In response to receiving the request, the application object is created, and an extension proxy object is created. The extension proxy object is wrapped around the application object. An invocation of a function of the extension proxy object is received from the application object.

BRIEF DESCRIPTION OF THE SEVERAL VIEWS OF THE DRAWINGS

Referring now to the drawings in which like reference numbers represent corresponding parts throughout:

FIG. 2 is formed by FIGS. 2A and 2B.

FIG. 5 is formed by FIGS. 5A and 5B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a framework for end-to-end database performance monitoring. Embodiments capture monitoring statistics in a distributed enterprise environment. Database processes on either the server side or the client side or both are seamlessly integrated within this framework to facilitate performance analysis based on monitoring statistics. Embodiments provide a tight integration between database processes and the framework to ensure minimal performance overhead and relevant (e.g., key) information collection for database monitoring. The framework also provides mechanisms for automatic or manual component discovery (e.g., key component discovery). These multiple mechanisms provide flexibility among various network environments. In addition, the automatic mechanisms eliminate burdensome setup and cumbersome configuration.

Figure 1:
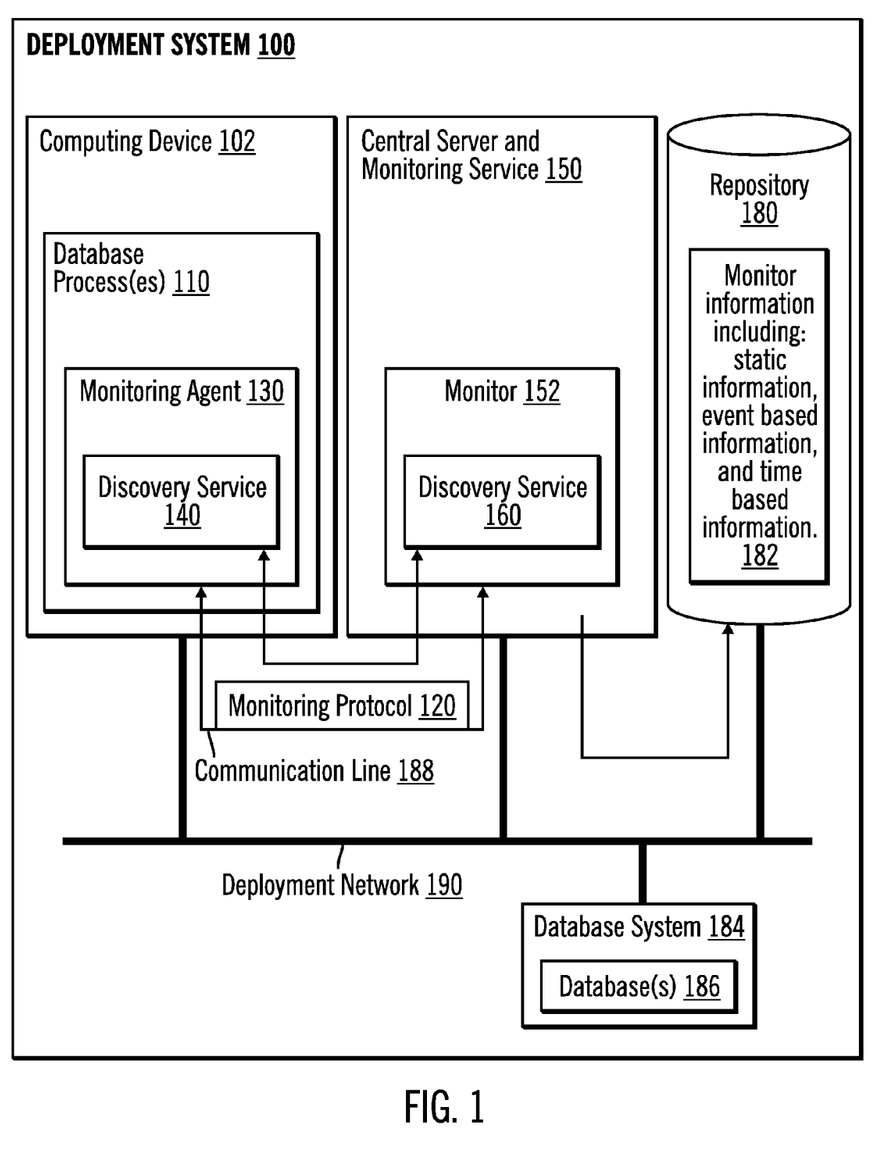
FIG. 1 illustrates a self-discovery framework that enables integrated monitoring of end-to-end database performance in accordance with certain embodiments.

FIG. 1 illustrates a deployment system 100 having a self-discovery framework that enables integrated monitoring of end-to-end database performance in accordance with certain embodiments. In the deployment system 100, a computing device 102, a central server and monitoring service 150, and a repository 180 are coupled by a communication path 190. The computing device 102 may be a client or a server. Although one instance of computing device 102 are illustrated, there may be many instances of the computing device 102 coupled to the communication path. The central server and monitoring service 150 may be any host (e.g., any computing device (even computing device 102) client or server) in the deployment network (i.e., the distributed enterprise environment). In certain embodiments, there are multiple instances of the central server and monitoring service 150 that can be discovered by the computing devices 102.

The computing device 102 includes one or more database processes 110. A database process 110 may be described as any sort of client application interacting with a database. The database process 110 includes a monitoring agent 130. The monitoring agent 130 includes a discovery service 140.

The central server and monitoring service 150 includes a monitor 152. The monitor 152 includes a discovery service 160.

A monitoring protocol 120 may be described as being on a communication line 188 (e.g., a "wire") connecting the monitoring agent 130 and monitor 152. In certain embodiments, communication line 188 is part of the deployment network 190. The monitoring protocol 120 defines commands and data involved in collecting monitoring statistics. The monitoring protocol 120 is part of the framework. The monitoring protocol 120 may be versioned and may be enhanced in the future while also supporting down-level versions.

In certain embodiments, the monitoring agent 130 is integrated into software supporting monitoring. In other embodiments, the monitoring agent 130 may take the form of hardware or firmware or some combination of software, hardware, and firmware. The monitoring agent 130 is initialized on load of the database process 110. The monitoring agent 130 runs on the database process 110 (where the database process can be a server or a client process) and uses the monitoring protocol 120 and the discovery service 140 to establish a connection and communicate monitoring statistics with the central server and monitoring service 150.

The discovery services 140, 160 provide a mechanism for discovering the central server and monitoring service 150. The discovery service 140, 160 has two parts: one for an instance of the computing device 102 and one for the central server and monitoring service 150. Discovery service 140 implements heuristics for discovering the central server and monitoring service 150 with no configuration or minimal configuration (e.g., configuration by a system administrator that is transparent to the database process 110).

The central server and monitoring service 150 provides a central location for monitoring agents 130 (i.e., one at each instance of computing device 102) to connect to and to communicate monitor information 182. The central server and monitoring service 150 collects data from instances of the computing device 102 and stores the data in the repository 180. For example, repository 180 includes monitor information 182 including: static information, event based information, and time based information. In certain embodiments, the central server and monitoring service 150 may be described as a process that runs on any host in the deployment network.

The repository 180 is used for storing information relevant to the deployment system 100 such as the monitored statistics collected. The repository 180 serves as a data store that can be queried and analyzed by tools specialized in consuming this information. In certain embodiments the repository 180 is part of a Relational Database Management System (RDBMS). In certain embodiments, the repository 180 may comprise an array of storage devices, such as Direct Access Storage Devices (DASDs), Just a Bunch of Disks (JBOD), Redundant Array of Independent Disks (RAID), virtualization device, etc.

The communication path 190 may comprise any type of communication path, such as, for example, a peer-to-peer network, spoke and hub network, Storage Area Network (SAN), a Local Area Network (LAN), Wide Area Network (WAN), the Internet, an Intranet, etc.

A database system 184 (coupled to the deployment network 190) may include one or more databases 186, and the database processes 110 may communicate with the databases 186.

Figure 2:
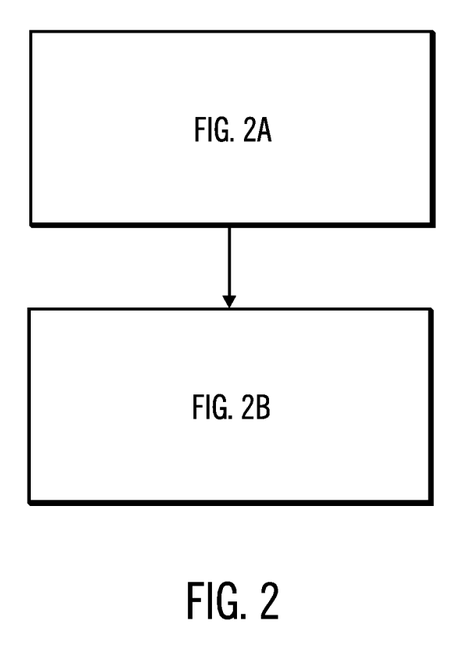
FIG. 2 illustrates logic, in a flow diagram, for monitoring of end-to-end database performance in accordance with certain embodiments.
Figure 2A:
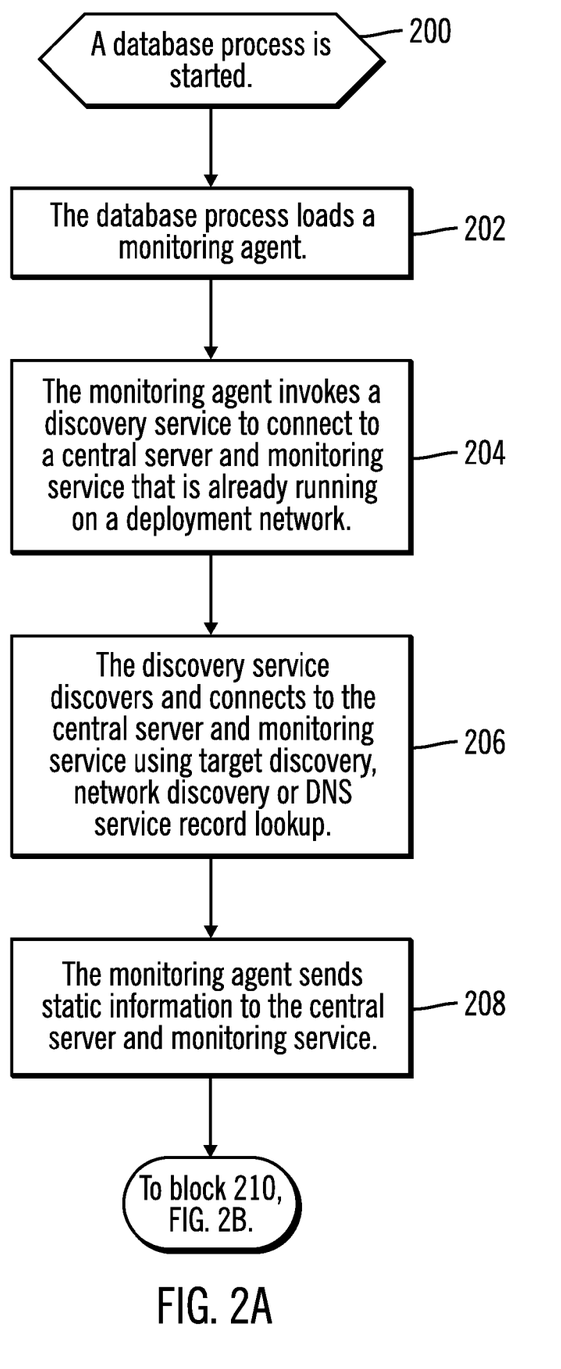

FIG. 2 illustrates logic for monitoring of end-to-end database performance in accordance with certain embodiments. FIG. 2 is formed by FIGS. 2A and 2B. The processing of FIG. 2 occurs when the central server and monitoring service 150 and the repository 180 are running on the deployment network. In block 200, a database process 110 (either on a client or a server) is started. In block 202, the database process 110 loads the monitoring agent 130. In block 204, the monitoring agent invokes the discovery service 140 to connect to the central server and monitoring service 150.

Figure 2B:
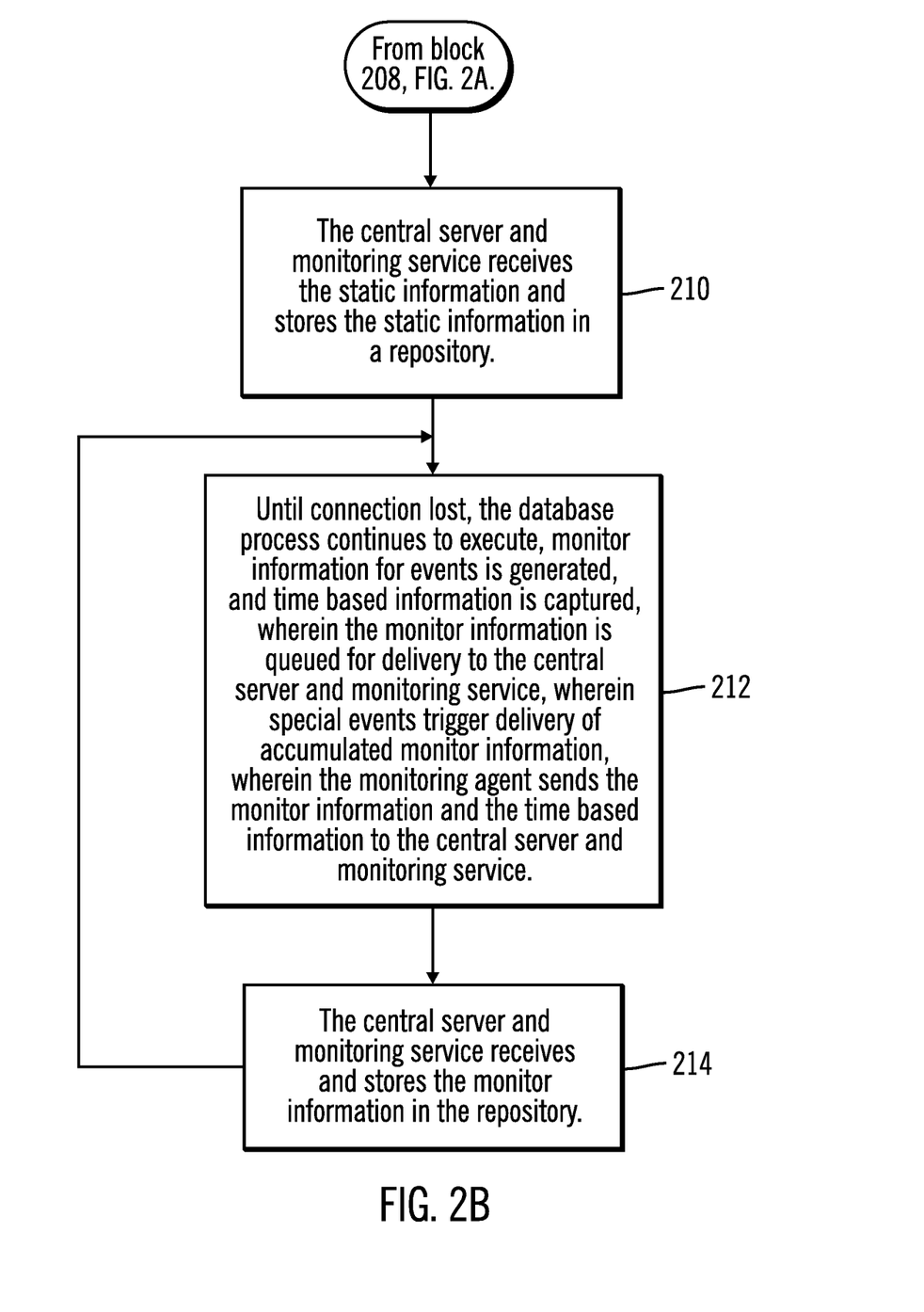

In block 206, the discovery service 140 discovers and connects to the central server and monitoring service 150 using targeted discovery, network discovery, or Domain Name System (DNS) service record lookup. In block 208, the monitoring agent 130 sends static information to the central server and monitoring service 150. From block 208 (FIG. 2A), processing continues to block 210 (FIG. 2B).

In block 210, the central server and monitoring service 150 receives the static information and stores the static information in the repository 180. In block 212, until the connection to the central server and monitoring service 150 is lost, the database process 110 continues to execute, event based information for events is generated, and time based information is captured at regular intervals. The event based information is stored (e.g., queued) for delivery to the central server and monitoring service. Special events may trigger delivery of accumulated event based information, and, when a special event occurs, the accumulated event based information is sent through the monitoring agent 130 to the central server and monitoring service. The monitoring agent 130 sends the event based information (when an event occurs) and the time based information (at regular intervals) to the central server and monitoring service 150.

In block 214, the central server and monitoring service 150 receives the event based information and the time based information and stores the event based information and the time based information in the repository 180. Monitor information 182 includes the time based information and the event based information. From block 214, processing loops back to block 212. The loop ends when the connection between the monitoring agent 130 and the central server and monitoring service 150 is broken or when either the monitoring agent 130 or the central server and monitoring service 150 stops processing.

At any time, new database processes at new instances of computing device 102 may be started in the deployment network. Also, the monitoring agent 130 is capable of sending static information, event based information, and time based information directly (i.e., without use of the discovery service 140) to the central server and monitoring service 150.

Figure 3:
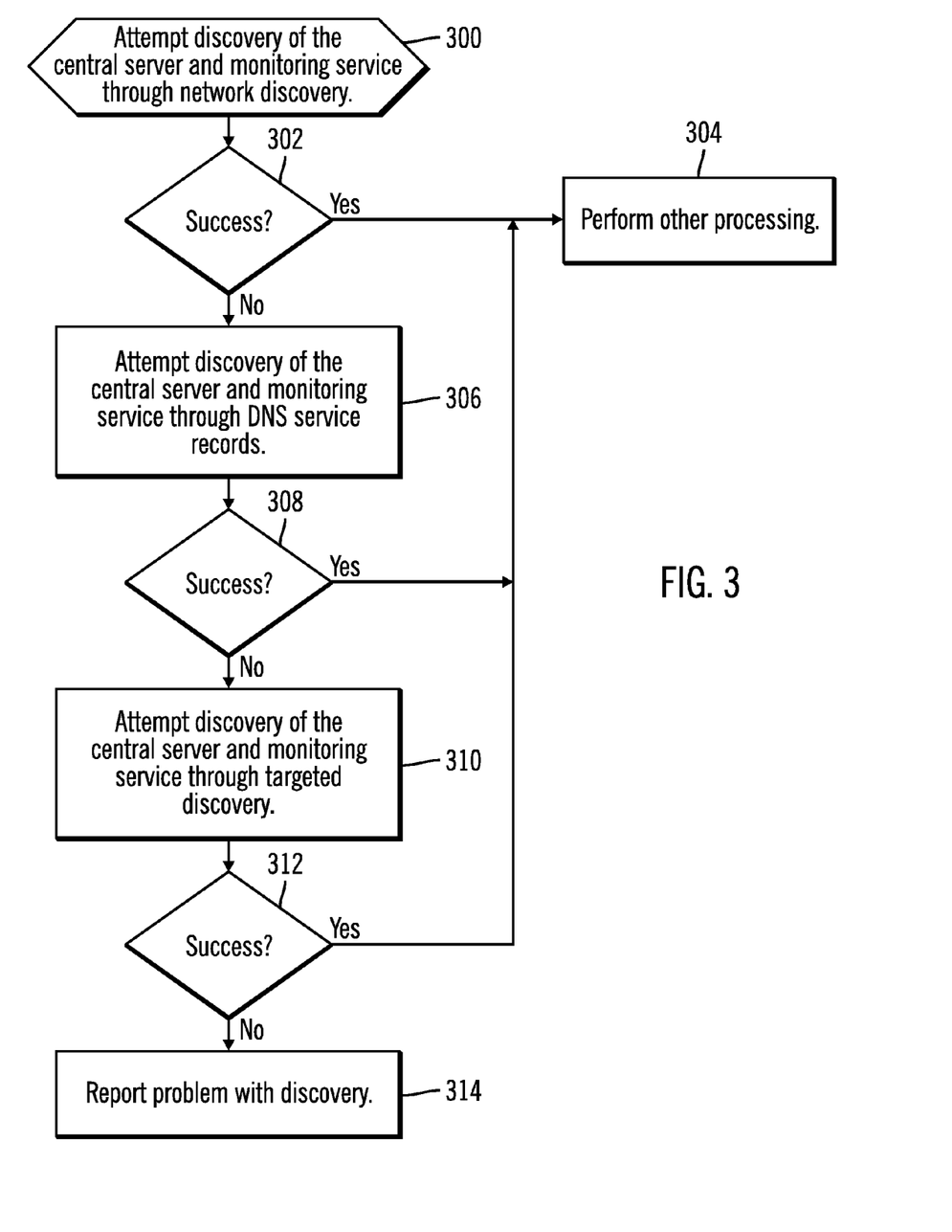
FIG. 3 illustrates logic, in a flow diagram, performed by the discovery service in accordance with certain embodiments.

The discovery service 140 provides a mechanism for the monitoring agent 130 to locate the central server and monitoring service 150. Due to a wide range of possible deployment environments/configurations, the discovery service 140 is flexible enough to accommodate different deployment environments/configurations. To accomplish this, the discovery service 140 is capable of using at least three techniques for locating the central server and monitoring service 150:

1. Network Discovery
 2. Domain Name System (DNS) Service Records
 3. Targeted Discovery FIG. 3 illustrates logic performed by the discovery service 140 in accordance with certain embodiments. Control begins at block 300 with the discovery service 140 attempting discovery of the central server and monitoring service 150 through network discovery.

Network discovery may provide a zero configuration technique for locating the central server and monitoring service 150. This technique discovers the central server and monitoring service 150 through Internet Protocol (IP) multicast (i.e., the delivery of information to a group of interested receivers) or broadcast (i.e., the delivery of information to all nodes (e.g., devices) on the deployment network 190). Discovery through network discovery works as follows:

1. The discovery service 160 on the central server and monitoring service 150 is initialized on a host connected to the deployment network and joins an IP multicast group to which the discovery service 160 listens for lookup requests.
 2. A database process 110 (also referred to as a monitored process) is started on the deployment network and invokes the discovery service 140.

3. The discovery service 140 queries for an available central server and monitoring service 150 using multicast or broadcast.

4. The discovery service 160 on the central server and monitoring service 150 responds with information necessary to connect (e.g., IP address/port).

5. The discovery service 140 uses the returned information to open a connection to the central server and monitoring service 150.

Network discovery is useful when a database and database applications run on a same subnetwork (i.e., a portion of the computers and devices on the deployment network that have a common, designated IP address routing prefix. When deployments are across subnets, routers or proxies may need to be setup or configured.

In block 302, the discovery service 140 determines whether the discovery was successful. If so, processing continues to block 304, otherwise, processing continues to block 306. In block 304, other processing occurs (e.g., collecting monitor information 182 and sending the monitor information 182 to the central server and monitoring service 150, where the monitor information 182 capture/reporting occurs as the database process 110 is executing).

In block 306, the discovery service 140 attempts to discovery of the central server and monitoring service 150 through DNS service records. Discovery through DNS service records provides another technique for discovering the central server and monitoring service 150 and does not depend on subnet layout. This technique is useful if a deployment is across subnets (i.e., subnetworks) within a single domain. A domain may be described as a collection of network devices that are organized under a common network name (i.e., domain name) in the Internet Domain Name System (DNS). If the DNS server for the deployment network supports updating of service records, then this technique is also a zero-configuration solution. If not, this technique requires minimal configuration involving adding DNS-Service (SRV) records for the monitoring application into the DNS servers for the deployment domain. A service record may be described as a category of data in the Internet Domain Name System specifying information on available services. Discovery through DNS service records works as follows:

1. The central server and monitoring service 150 is started on a host domain (e.g., server1.dev.foobar.com).

2. The discovery service 160 on the central server and monitoring service 150 creates/updates the DNS service record for the central server and monitoring service 150 that points to the IP address/port of the central server and monitoring service 150 for a domain (e.g., dev.foobar.com).

3. A database process 110 with a monitoring agent 130 is started on a host (e.g., host1.dev.foobar.com) and invokes the discovery service 140.

4. The discovery service 140 performs a DNS service record lookup for the central server and monitoring service 150 record on a domain (e.g., dev.foobar.com).

5. The DNS server responds with the lookup information necessary to connect (e.g., IP address/port)

6. The discovery service 140 uses the returned information to open a connection to the central server and monitoring service 150.

In block 308, the discovery service 140 determines whether the discovery was successful. If so, processing continues to block 304, otherwise, processing continues to block 310. In block 304, the discover service attempts to discover the central server and monitoring service 150 through targeted discovery. This technique of discovery involves configuring either a system or process variable to point to a host that provides lookup information. Discovery through targeted discovery works as follows:

1. A lookup server is started. This can be the discovery service 160 on the central server and monitoring service 150 or a standalone lookup server (not shown in FIG. 1).

2. A computing device 102 (also referred to as an application host in some embodiments) has a special system or process variable configured to point to the lookup server.

3. A database process 110 is started and the discovery service 140 is invoked. The discovery service 140 makes a request to the lookup server designated in the system/process variable. This request can be as simple as HTTP/GET.

4. The lookup server responds with lookup information necessary to connect (e.g., IP address/port).

5. The discovery service 140 uses the returned information to open a connection to the central server and monitoring service 150.

The monitoring protocol 120 defines the command and object data involved in monitoring. The monitoring protocol 120 takes two considerations into account.

1. What information to capture.
2. How to deliver the information.

The first consideration is what information to capture. There is a wide range of valuable information to collect for monitored database processes running in the deployment system 100. Some different types of information may be categorized into 3 groups:

1. Static information
2. Event based information
3. Time based information

Static information may include details such as the information about the host operating system, physical memory, process identifier (ID), versions, runtime properties, etc. Static information does not change as the monitored database processes execute.

Event based information captures state information specific to when particular events occur in the deployment system 100. A database system 184 (coupled to the deployment network 190) may include one or more databases 186, and the database process 110 may communicate with the databases 186. In the database system 184, events may include opening/closing of connections, start/end of transactions, statement executions, exceptions, etc. Each event may contain different detail information. For example event information for statement executions may include start timestamp, driver time, network time, server time, and number of round trips, etc. Events can even be triggered when particular statistics exceed a defined threshold. For instance, there can be a threshold for the number of open statements, and an event is generated when that threshold is exceeded.

Time based information consists of a wide range of statistics that fluctuate over time. These statistics can be collected at regular intervals. Time based information statistics can include: available memory, used memory, Central Processing Unit (CPU) consumption, number of connections, peak number of connections, connection pool wait time, etc.

In terms of defining how to deliver the information, delivery defines how to send the information and when to send the information. The information collected may be serialized into object data for transport over the wire. The object data format may be either binary or string based (Extensible Markup Language (XML), JavaScript® Object Notation (JSON), etc.) (Javascript Solaris is a registered trademark or common law mark of Oracle Corporation in the United States and/or other countries). Efficiently sending monitor information 182 helps ensure minimal performance impact to the process being monitored. The monitor information 182 may be sent as the information is collected or may be accumulated (i.e., bundled) with other information. The monitor information 182 transmission may be defined such that the monitor information 182 may be bundled and transported when specific events occur, such as the end of a unit of work. This way the transmission minimizes impact to the current unit of work.

Thus, the monitoring agent 130 is included in monitoring enabled database clients and servers. The monitoring agent 130 is responsible for communicating with the central server on behalf of the monitored database processes. There is typically one monitoring agent 130 per process to be monitored. The monitoring agent 130 is initialized on load of the database process 110 and invokes the discovery service 140 to establish a connection with the central server and monitoring agent 150.

The central server and monitoring service 150 may be described as a deployment wide server responsible for communicating with monitoring agents on instances of computing device 102 and handling the received information. Monitoring agents connected to the central server and monitoring service 150 send monitor information 182 through the monitor application protocol 120. The central server and monitoring service 150 extracts the monitor information 182 sent over the communication line 188 and stores the information in the repository 150.

The repository 180 serves as a data store for information collected by the central server and monitoring service 150 from monitoring agents on instances of the computing device 102. The repository 180 may be a persistent store for collected information and makes the information available for analysis tools.

Integrated Extension Framework

Embodiments provide an integrated extension framework that enables the addition of enhancements to an existing application for which the application was not designed. Examples of such enhancements include the ability to monitor the application (i.e., perform reads to monitor the state of the application, usually in context of health and performance) or to control the application (i.e., perform writes to configure/re-configure the application or to invoke functions on the application). The enhancements are also optional so that an application functions as expected both with and without any enhancements present. The integrated extension framework enables applications to automatically find and load extensions that may or may not be installed on the integrated extension framework of FIG. 4. The integrated extension framework, which provides extension read/write capabilities on top of applications, enables functionality and usability for the applications.

Figure 4:
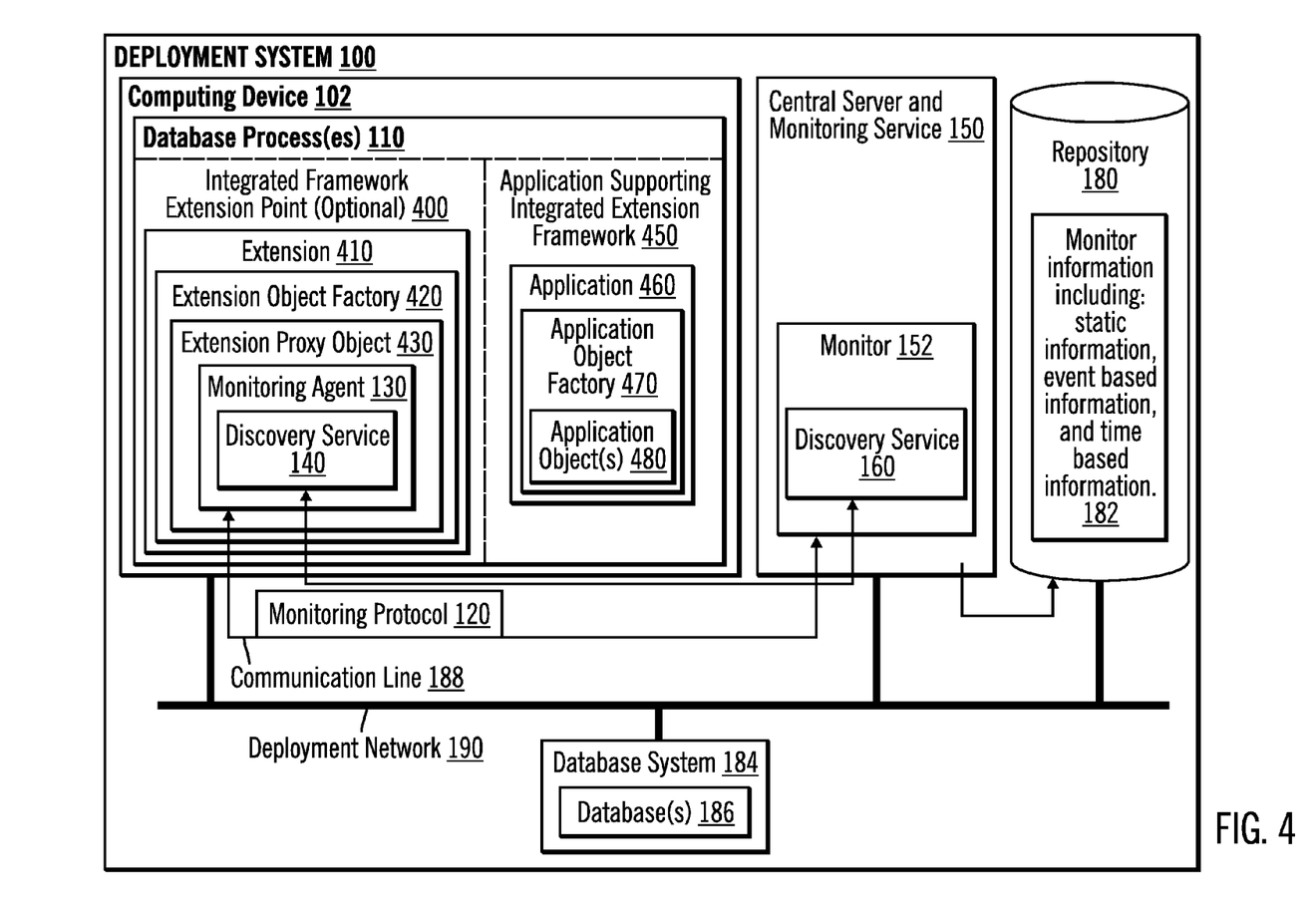
FIG. 4 illustrates an integrated extension framework in accordance with certain embodiments.

FIG. 4 illustrates an integrated extension framework in accordance with certain embodiments. In FIG. 4, the one or more database processes 110 include an integrated framework extension point 400 that is optional and an application supporting integrated framework 450. The integrated framework extension point 400 is optional as the application 460 is designed to function with and without extensions being present.

An extension 410 includes an extension object factory 420. The extension object factory 420 includes an extension proxy object 430. The extension proxy object 430 includes a monitory agent 130. The monitoring agent 130 includes a discovery service 140.

The application supporting integrated framework 450 includes an application 460. The application 460 includes an application object factory 470. The application object factory 470 includes an application object 480.

Although one extension proxy object 430 and one application object 480 are illustrated, any number of extension proxy objects and application objects may be created in various embodiments.

The application 460 may create new objects. Typically, object factories are used for creation of the new objects. With the integrated extension framework, the application 460 supporting the integrated extension framework notifies the extension object factory 420 when a new application object 480 is to be created. At that point, the extension object factory 420 performs actions to create the extension proxy object 430 for the new application object 480 and returns the extension proxy object 430 to the application object factory 470.

The extension proxy object 430 may be described as wrapping the application object 480. Wrapping may be described as the extension proxy object 430 acting as a replacement for the application object 480. This allows the extension proxy object 430 to provide the extended behavior. Furthermore, the extension proxy object 430 may be described as containing the application object 480 as a variable.

The following is an example of an application object class:

```
class ApplicationObject {
    doA( ) { }
    doB( ) {}
    doC( ) { }
}
```

The application object class includes three methods or functions: "doA( )", "doB( )", "doC( )".

The following is an example of an extension proxy object class that wraps around (i.e., includes) the application object as a variable:

```
class ExtensionProxyObject {
    ApplicationObject a
    doA( ) {
        <do extended behavior>
        a.doA( );
        <do extended behavior>
    }
}
```

In the above example of the extension proxy object class, the "doA( )" method of the application object class provides "extended" or different behavior. In particular, an extension proxy object 430 is instantiated from the extension proxy object class, and an application object 480 is instantiated from the application object class. Then, the extension proxy object 430 intercepts messages to the application object 480. If the message is to invoke the "doA( )" method, then, the extension proxy object 430 actually performs the extended behavior of the wrapped application object 480. However, if the message is to invoke the "doB( )" method, the extension proxy object 430 invokes the "doB( )" (unextended) method of the application object 480. Also, the extension proxy object 430 may intercept messages from the application object 480 and may either transform the messages in some manner (e.g., changing data that is returned) or may route the messages to the element that issued the message invoking the method.

In certain embodiments, the extension proxy object 430 includes a method that determines which method of the wrapped application object 480 is to be invoked.

The extension proxy object 430 allows operations to be intercepted by the extension 410, thus, allowing for read/write access to the application 460.

The integrated extension framework also provides a means of communication between the application 460 and the extension 410. The extension 410 has the ability to invoke methods and/or functions available on the application object 480. In addition, the integrated extension framework provides more specialized communication for use by the extension 410 to communicate with the application 460. With the integrated extension framework, the application 460 is also able to communicate with the extension 410. Thus, the integrated extension framework provides two way communications between the application 460 and the extension 410.

In certain embodiments, the following Integrated Extension Framework (IEF) interface is defined which is implemented by the extension proxy object 430 and the application object 480.

```
interface IEF {
    Object message (Object message_id, Object...);
}
```

Once the extension proxy object 430 is created, the extension proxy object 430 can invoke the message( )method to notify the application object 480 that it has been proxied so that the application 460 may communicate with the extension 410. Messages are defined with a message identifier ("message_id"). In certain embodiments, each message identifier may have an arbitrary length of arguments. In certain embodiments, the message identifier can be defined for relevant actions and/or notifications between the extension 410 and the application 460.

Figure 5:
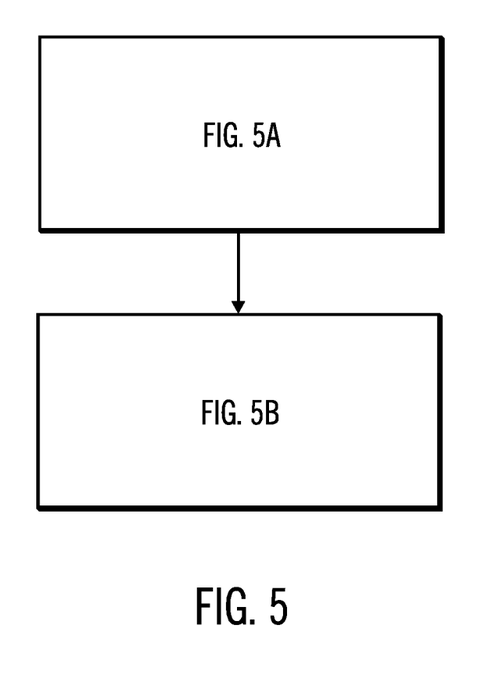
FIG. 5 illustrates logic, in a flow diagram, for using an extension proxy object in accordance with certain embodiments.
Figure 5A:
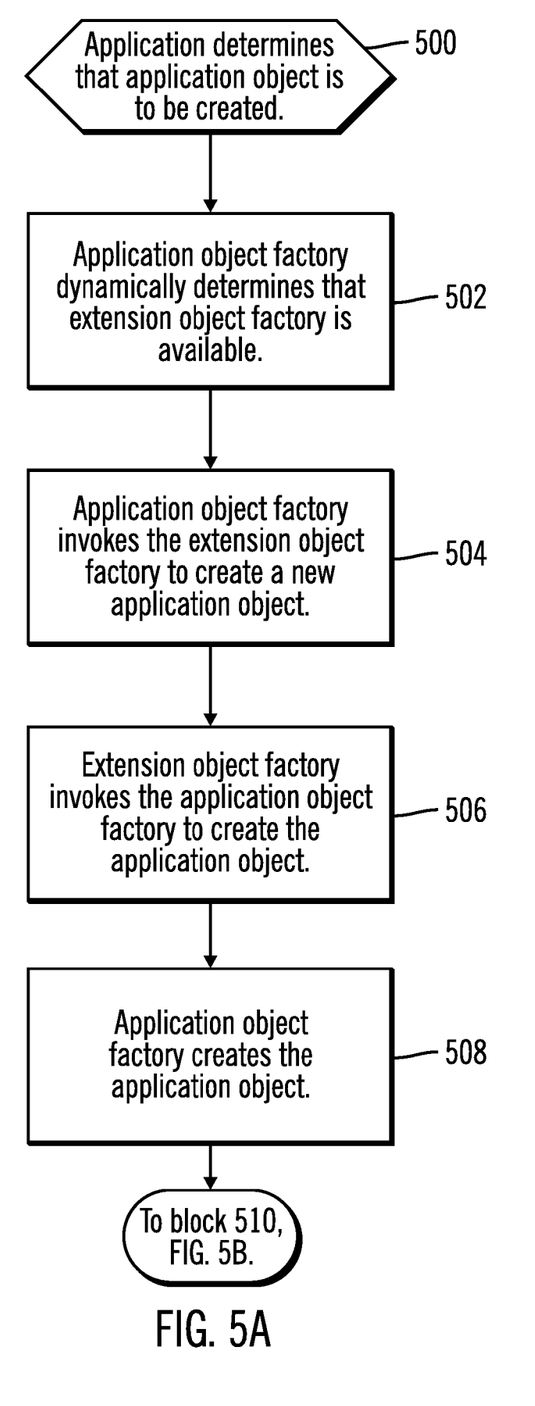
Figure 5B:
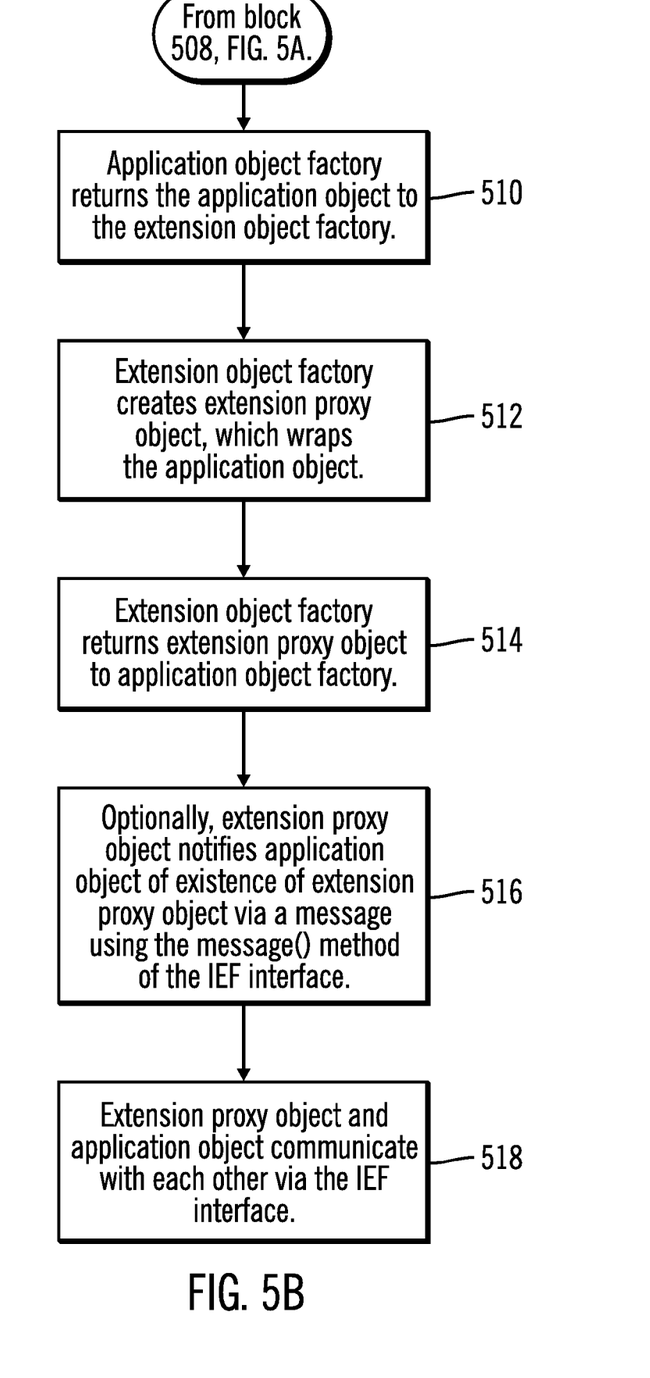

FIG. 5 illustrates logic, in a flow diagram, for using an extension proxy object in accordance with certain embodiments. FIG. 5 is formed by FIGS. 5A and 5B. Control begins at block 500 with the application 460 determining that an application object 480 is to be created. In block 502, the application object factory 470 dynamically determines that the extension object factory 420 is available. In block 504, the application object factory 470 invokes the extension object factory 420 to create a new application object 480 (i.e., issues a request to the extension object factory 420 to create the application object 480). In block 506, the extension object factory 420 invokes the application object factory 470 to create the application object 480. With this invocation, the application object factory 470 is aware that it is being invoked from the extension object factory 420, and the application object factory 470 creates the application object 480. In block 508, the application object factory 470 creates the application object 480. From block 508 (FIG. 5A), processing continues to block 510 (FIG. 5B). In block 510, the application object factory 470 returns the application object 480 to the extension object factory 420. Because the extension object factory 420 invokes the application object factory 470 to create the application object 480, the extension object factory 420 may be said to create the application object 480. In block 512, the extension object factory 420 creates an extension proxy object 430, which wraps the application object 480. In block 514, the extension object factory 420 returns the extension proxy object 430 to the application object factory 470. In block 516, optionally, the extension proxy object 430 notifies the application object 480 of the existence of the extension proxy object 430 via a message using the message( )method of the Integrated Extension Framework (IEF) interface. In block 518, the extension proxy object 430 and the application object 480 communicate with each other via the IEF interface.

In certain embodiments, the application object factory 470 dynamically determines whether the extension object factory 420 is available. If the extension object factory 420 is not available, the application object factory 470 creates application objects. If the extension object factory 420 is available, the application object factory 470 forwards requests to create application objects to the extension object factory 420 for proxying (i.e., for creating corresponding extension proxy objects 430). Thus, once creation of a new application object 480 is requested, the extension object factory 420 is invoked to wrap the application object 480. In particular, the extension object factory 420 creates an instrumented extension proxy object 430, which wraps the application object 480. The extension 410 returns the extension proxy object 430 to the application object factory 470. Optionally, the extension proxy object 430 can notify the application object 480 of its existence via a message using the message( )method of the Integrated Extension Framework (IEF) interface. Then, the application object 480 can communicate with the extension proxy object 430 via the IEF interface, and the extension proxy object 430 can communicate with the application object 480 via the IEF interface.

The following pseudocode represents a create object ("createObject") method of the application object factory 470 that works with the integrated extension framework:

```
Object createObject (args) {
    if (EOF available && !called EOF) {
        called EOF = true;
        EOF.createObject (createObject method, args)
    }
    else {
        // other object creation logic
    }
}
```

With the pseudocode, the create object method determines whether the extension object factory 420 (EOF in the pseudocode) is available and should be called. If the extension object factory 420 is to be called, then the application object factory 470 invokes the extension object factory 420 using the "EOF.createObject (createObject method, args)" method of the extension object factory 420. Otherwise, other object creation logic is performed.

Once the application object 480 and extension proxy object 430 can communicate, the application object 480 is able to invoke methods and/or functions of the extension proxy object 430. In this manner, the integrated extension framework extends functionality of an application. In particular, the extension proxy object 430 wraps the application object 480 and is able to proxy calls to the application object 480 (i.e., the extension proxy object 430 acts as an intermediary for requests issued to the application object 480) or modify the calls to the application object 480.

In certain embodiments, the monitoring agent 130 comprises a separate object performing a monitoring function, which is part of the extension proxy object 430. The extension proxy object 430 enables the application object 480 to invoke methods and functions of the extension proxy object 430. In particular, the extension proxy object 430 enables the application object 480 to invoke the monitoring function implemented by a monitoring agent 130.

The monitoring agent 130 serves as a central point of data aggregation and processing of all data gathered from the individual extension proxy objects. In certain embodiments, data may be gathered by one or more extension proxy objects and one or more application objects. For example, the data gathered by the extension proxy objects may be computed from the extension proxy objects and/or derived from information from application objects. Information from the application objects may be derived via the ability to communication between the application objects and the extension proxy objects. In particular, the application objects may provide the information 1) via the extension factory objects' ability to communicate to the application objects or from the extension factory objects' ability to make calls on the application objects to get additional information.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 6:
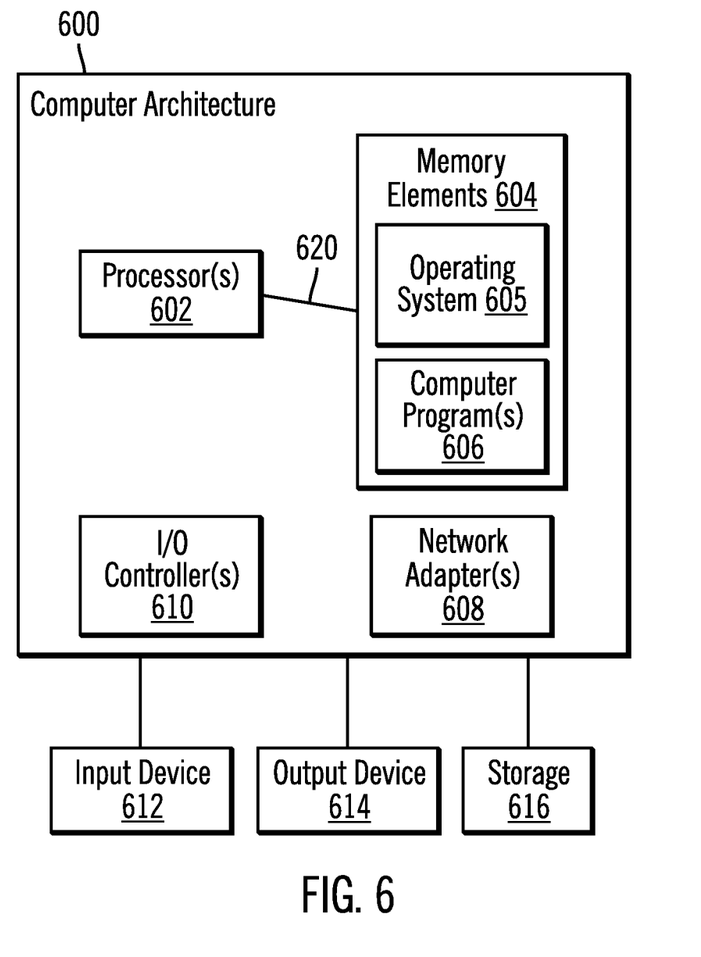
FIG. 6 illustrates a system architecture that may be used in accordance with certain embodiments.

FIG. 6 illustrates a system architecture 600 that may be used in accordance with certain embodiments. Computing device 102 and/or central server and monitoring service 150 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for extending functionality of an application, comprising:
   in response to receiving a request to create an application object,
      creating, using a processor of a computer, the application object with one or more application methods;
      creating an extension proxy object with an extended method corresponding to at least one of the one or more application methods, wherein the extended method provides additional functionality for the application object; and
      wrapping the extension proxy object around the application object, wherein the extension proxy object:
         intercepts a message to the application object;
         in response to determining that the message identifies an application method from the one or more application methods with a corresponding extended method, performs the extended method; and
         in response to determining that the message identifies an application method from the one or more application methods without a corresponding extended method, invokes the application method.

2. The method of claim 1, wherein an extension object factory invokes an application object factory to create the application object, and wherein the application object factory creates the application object.

3. The method of claim 1, further comprising:
   enabling the extension proxy object to invoke the application method of the application object.

4. The method of claim 1, further comprising:
   under control of an application object factory,
      determining that an extension object factory is available;
      issuing the request to the extension object factory; and
      receiving the extension proxy object wrapped around the application object from the extension object factory.

5. The method of claim 1, further comprising:
   providing a new Integrated Extension Framework (IEF) interface to enable the application object and the extension proxy object to communicate by sending messages.

6. The method of claim 1, wherein the extended method comprises a monitoring function implemented by a monitoring agent.

7. A computer program product for extending functionality of an application, the computer program product comprising:
   a non-transitory computer readable storage medium having computer readable program code embodied there-with, wherein the computer readable program code, when executed by a processor of a computer, is configured to perform:

in response to receiving a request to create an application object,
creating the application object with one or more application methods;
creating an extension proxy object with an extended method corresponding to at least one of the one or more application methods, wherein the extended method provides additional functionality for the application object; and
wrapping the extension proxy object around the application object, wherein the extension proxy object:
intercepts a message to the application object;
in response to determining that the message identifies an application method from the one or more application methods with a corresponding extended method, performs the extended method; and
in response to determining that the message identifies an application method from the one or more application methods without a corresponding extended method, invokes the application method.

8. The computer program product of claim 7, wherein an extension object factory invokes an application object factory to create the application object, and wherein the application object factory creates the application object.

9. The computer program product of claim 7, wherein the computer readable program code, when executed by the processor of the computer, is configured to perform:
enabling the extension proxy object to invoke the application method of the application object.

10. The computer program product of claim 7, wherein the computer readable program code is first computer readable program code and comprising:
second computer readable program code, when executed by the processor of the computer, is configured to perform:
under control of an application object factory,
determining that an extension object factory is available;
issuing the request to the extension object factory; and
receiving the extension proxy object wrapped around the application object from the extension object factory.

11. The computer program product of claim 7, wherein the computer readable program code, when executed by the processor of the computer, is configured to perform:
providing a new Integrated Extension Framework (IEF) interface to enable the application object and the extension proxy object to communicate by sending messages.

12. The computer program product of claim 7, wherein the extended method comprises a monitoring function implemented by a monitoring agent.

13. A computer system for extending functionality of an application, comprising:
a processor; and
a storage device coupled to the processor, wherein the storage device has stored thereon a program, and wherein the processor is configured to execute instructions of the program to perform operations, wherein the operations comprise:
in response to receiving a request to create an application object,
creating the application object with one or more application methods;
creating an extension proxy object with an extended method corresponding to at least one of the one or more application methods, wherein the extended method provides additional functionality for the application object; and
wrapping the extension proxy object around the application object, wherein the extension proxy object:
intercepts a message to the application object;
in response to determining that the message identifies an application method from the one or more application methods with a corresponding extended method, performs the extended method; and
in response to determining that the message identifies an application method from the one or more application methods without a corresponding extended method, invokes the application method.

14. The system of claim 13, wherein an extension object factory invokes an application object factory to create the application object, and wherein the application object factory creates the application object.

15. The system of claim 13, wherein the operations further comprise:
enabling the extension proxy object to invoke the application method of the application object.

16. The system of claim 13, wherein the program is a first program, and wherein the storage device has stored thereon a second program, and wherein the processor is configured to execute instructions of the second program to perform operations, wherein the operations comprise:
under control of an application object factory,
determining that an extension object factory is available;
issuing the request to the extension object factory; and
receiving the extension proxy object wrapped around the application object from the extension object factory.

17. The system of claim 13, wherein the operations further comprise:
providing a new Integrated Extension Framework (IEF) interface to enable the application object and the extension proxy object to communicate by sending messages.

18. The system of claim 13, wherein the extended method comprises a monitoring function implemented by a monitoring agent.

* * * * *